INVENTOR:-
WALTER VAN GUILDER
BY William C. Babcock ATTORNEY

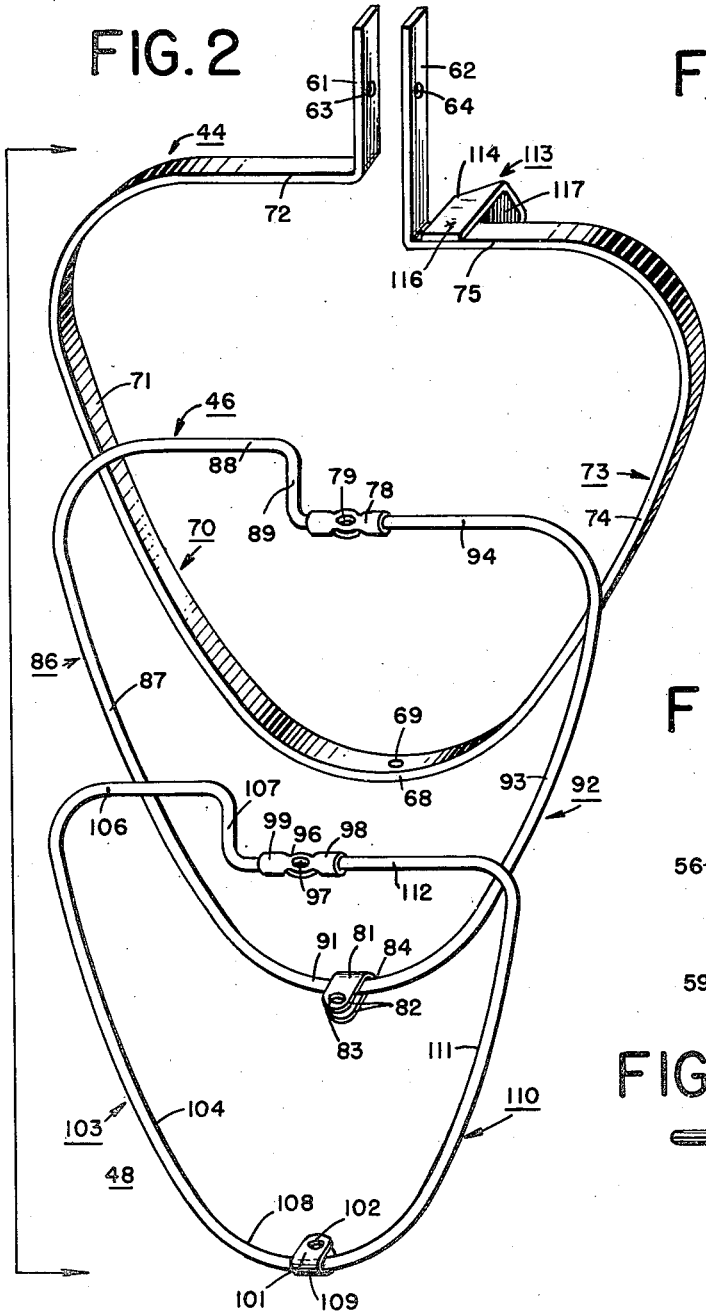

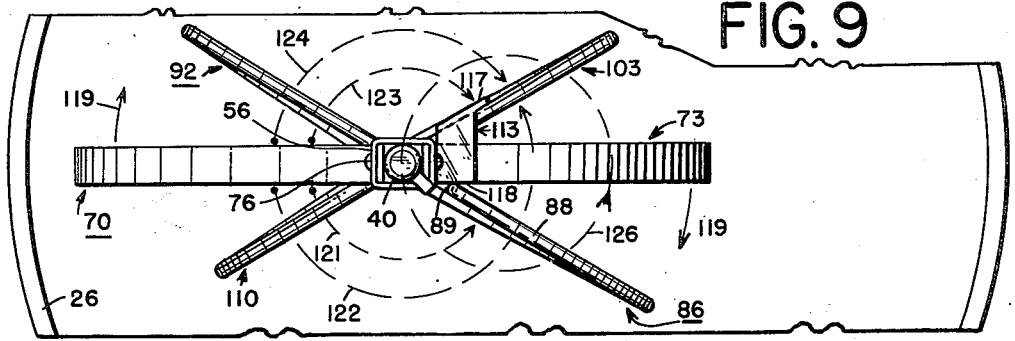
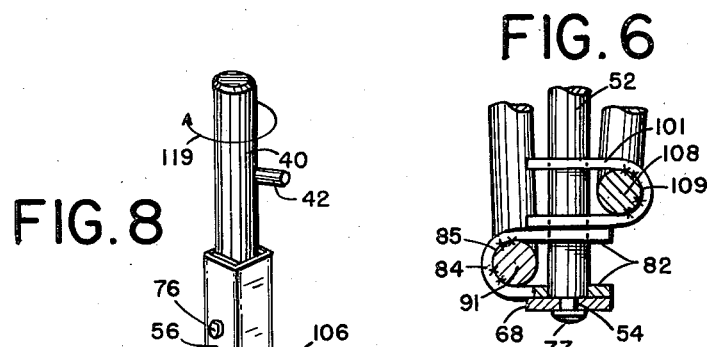
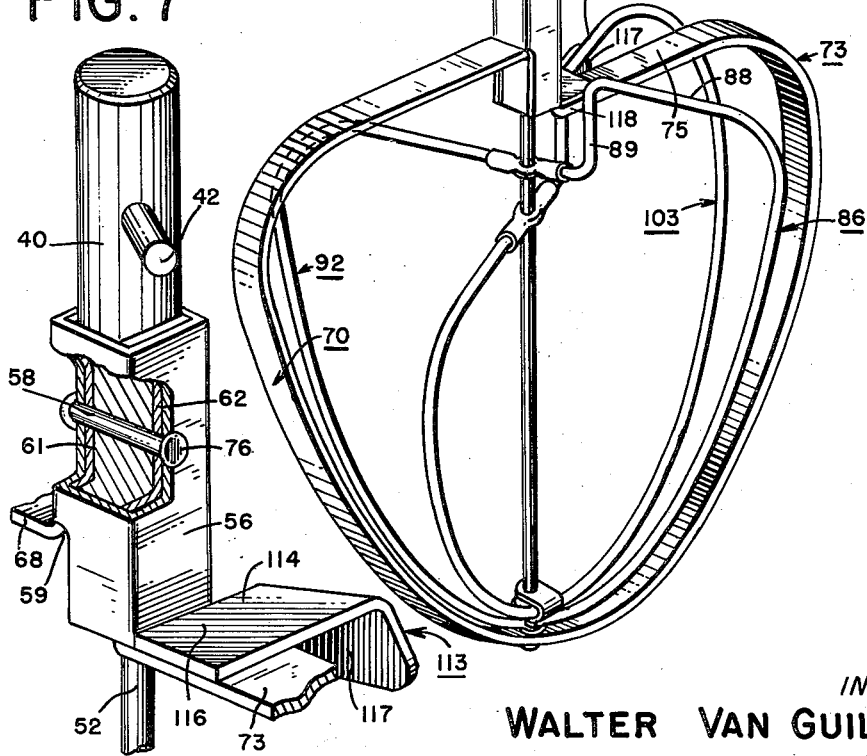

Oct. 16, 1951   W. VAN GUILDER   2,571,316
BEATER FOR FOOD MIXERS
Filed March 23, 1949   4 Sheets-Sheet 4
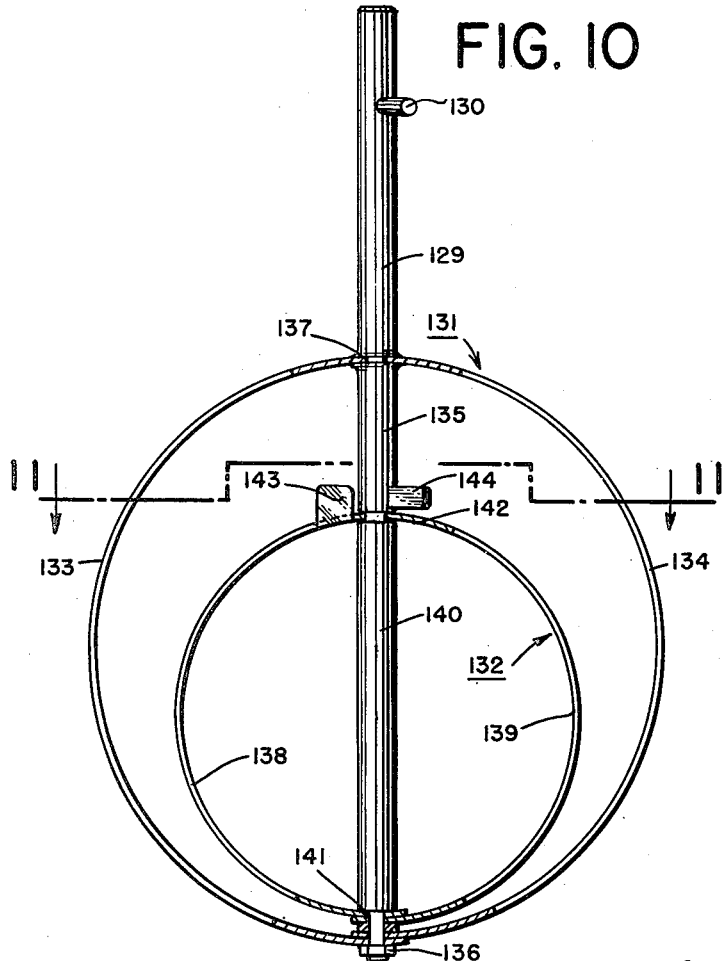
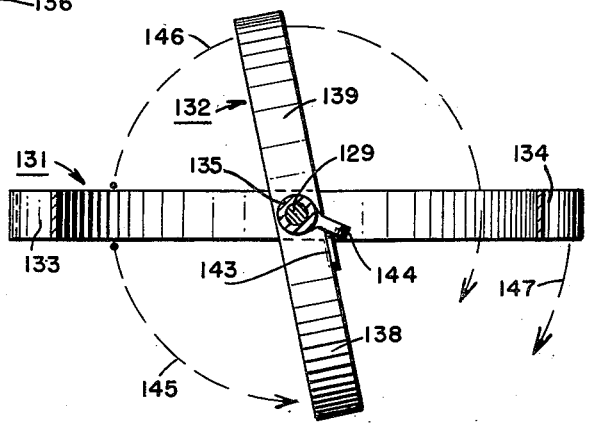
INVENTOR:
WALTER VAN GUILDER
BY William C. Babcock ATTORNEY Patented Oct. 16, 1951

2,571,316

UNITED STATES PATENT OFFICE 2,571,316

BEATER FOR FOOD MIXERS

Walter Van Guilder, River Forest, Ill., assignor to General Mills, Inc., a corporation of Delaware Application March 23, 1949, Serial No. 82,944

24 Claims. (Cl. 259—132)

The present invention relates to food mixers and more particularly to an improved beater assembly for such mixers.

Many specific types of beater construction have been proposed in the past for food mixing purposes. Some of the more efficient earlier types have incorporated a plurality of beater elements which were angularly mounted with respect to each other. While these beaters had relatively good operating efficiency, they were extremely difficult to clean. Frequently during their use a large mass of the material being mixed would collect in a ball or lump at the interior of the beater elements and could be dislodged from this position only with difficulty. Even in beater assemblies which involved substantially coplanar beater elements as distinguished from the angularly displaced beater loops, proper cleaning of the assembly was difficult.

With these and other defects of the prior methods of construction in view, it is accordingly one object of the present invention to provide an improved beater assembly for food mixers.

Another object is the provision of an improved beater assembly which can be readily cleaned.

A further object is a beater assembly in which a plurality of beater elements are relatively rotatable between angularly displaced positions and a substantially aligned coplanar position.

Still another object of the invention is an improved beater assembly in which a plurality of beater elements may be relatively rotated in either direction from a substantially aligned position for greater ease of cleaning.

An additional object is the provision of a beater assembly in which at least one of the beater elements has an unsymmetrically offset portion for engagement from another beater element.

Other objects and advantages of the invention will be apparent from the following specification in which one preferred embodiment of the invention is described.

In the drawings which form a part of this specification,

Fig. 2 is an exploded view, in bracket, of the beater elements of the device of Fig. 1.

Fig. 3 is a perspective view of the beater shaft of Fig. 1.

Fig. 4 is a perspective view of a locking sleeve for one of the beater elements.

Fig. 5 is a perspective view of an assembly pin for cooperation with the sleeve of Fig. 4.

Fig. 6 is a partial sectional view on the line 6—6 of Fig. 1 showing details of the beater element mountings at the free end of the shaft.

Fig. 7 is a perspective view with certain portions cut away showing details of the attachment of one of the beater elements at the driven end of the shaft.

Fig. 8 is a perspective view of the complete beater assembly showing the beater elements in the relative positions which they occupy during operation of the assembly.

Fig. 9 is a partial top plan of the beater assembly with the various elements in their respective operating positions corresponding to Fig. 8.

Fig. 10 is an elevation of another embodiment of the invention, with the beater elements in an aligned cleaning position; and Fig. 11 is a top plan of the device of Fig. 10, but with the beater elements in their angularly displaced operating position.

Figure 1:
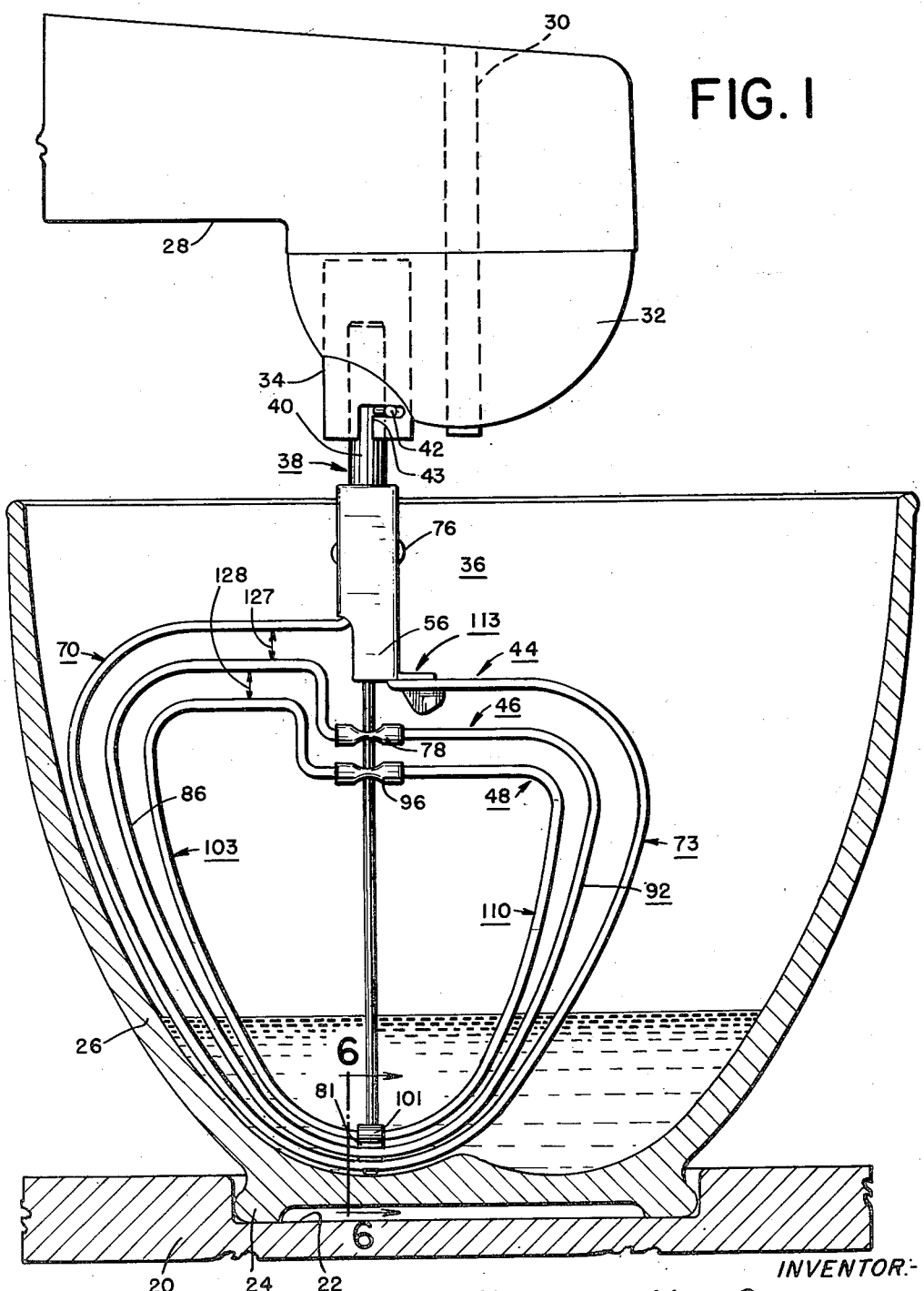
Figure 1 is a side elevation, partly in section, of portions of a household food mixer in which an improved beater assembly according to the present invention is mounted.

In Fig. 1, a preferred form of my improved beater assembly has been shown in connection with a food mixer of the well known planetary type. The mixer includes a base plate 20 provided with a recess 22 or other suitable support for the bottom 24 of a mixing bowl 26. One end 28 of a suitable power unit is mounted above the base 20 and bowl 26 and may be moved to and from the operating position of Fig. 1 in known manner.

Power unit 28 includes a vertical shaft 30 which rotates a mixing head 32. The mixing head 32 includes a planetary shaft 34 in which the beater assembly 36 may be detachably mounted. In this type of food mixer the beater assembly 36 rotates in one direction on the axis of planetary shaft 34 while the planetary shaft as a whole revolves simultaneously around the central shaft 30.

The beater assembly 36 includes a beater shaft 38 and a plurality of beater elements designated generally as 44, 46, and 48.

Beater shaft 38, shown in Fig. 3, includes a driven end 40 for removable attachment to the planetary shaft 34 of the power unit in any well known manner. Since the particular means of attachment forms no part of the present invention I have shown merely a conventional driving pin 42 and a bayonet slot 43 to connect the beater shaft and planetary shaft for simultaneous rotation.

The driven end of the shaft 38 includes a rectangular or non-circular portion 50. In the embodiment shown, this portion 50 is provided with a transverse opening 51 of circular cross section. The lower or free end of shaft 38 is circular in cross section and of relatively small diameter as indicated at 52. This portion of the shaft serves as a support for some of the beater elements, certain of these elements being rotatably mounted thereon. The extreme lower or free end of shaft portion 52 is shouldered or reduced in cross section as indicated at 54 for attachment of the lower portion of one of the beater elements. In the form shown, the shaft portion 52 is made separately from the driven end 40 and non-circular portion 50 of shaft 38 and is rigidly attached to the end of the square portion 50, as shown at 53, so that all elements of the shaft 38 rotate as a unit.

A locking sleeve 56 shown in Fig. 4, is designed for cooperation with the rectangular portion 50 of shaft 38. Sleeve 56 is square in cross section and includes lateral openings 57 for alignment with the transverse passage 51 of shaft portion 50. One side of the square sleeve 56 is cut away at its lower end as indicated at 59 for a purpose to be described. The cross pin 58, shown in Fig. 5, is adapted for insertion in the aligned openings 51 and 57 for assembly of one of the beater elements to be described.

The first beater element 44 includes upper and lower bearing portions and first and second opposed beater members or loops. The upper bearing portion includes a pair of axially extending strips 61 and 62 provided with openings 63 and 64 respectively.

The first beater loop 70 extends from the upper bearing strip 61 to a lower bearing portion 68. This loop includes a radial portion 72 adjacent bearing portion 61 and a substantially axial or bowl-shaped portion 71 extending downwardly and inwardly from the outer end of radial portion 72 to the lower bearing portion 68. As shown in Fig. 1, the shape of loop portion 71 corresponds closely to the shape of the interior of the mixing bowl 26 in order that beater element 44 may agitate thoroughly all portions of the substance to be mixed which lie immediately adjacent the surface of the bowl. The lower bearing portion 68 includes an opening 69 of a size to fit the reduced end 54 of shaft 38.

In the example shown, the second beater loop 73 is formed as an integral extension of the first loop 70. While this is particularly advantageous where the lower portions of all beater elements are to be closely spaced axially of the shaft, it is also possible in certain cases to make the two loops of separate pieces. It is also possible, in some cases, to have one of the two loops angularly displaced from the plane of the other loop, rather than exactly opposed in the same plane. The second loop includes the substantially axial or bowl-shaped portion 74 extending upwardly and outwardly from the lower bearing portion 68 to the outer end of a radial portion 75. The shape of the second loop portion 74 is preferably substantially symmetrical with respect to the shape of the corresponding portion of the first loop 71 in order that the major portions of these two beater loops may travel through paths equally distant from the axis of shaft 38.

According to the present invention, the radial portions 72 and 75 of the respective first and second beater loops are unsymmetrically offset with respect to each other. In this case, the direction of relative offset is essentially axial. Thus these portions travel through paths at different levels with respect to the axis of shaft 38. The functioning of these unsymmetrically offset portions is described in greater detail below.

The manner in which beater element 44 is attached to shaft 38 is shown in Figs. 6 and 7. Thus in Fig. 6, the lower or free end portion 54 of shaft 38 extends through the opening 69 of lower bearing portion 68 and is flattened or riveted as indicated at 77 to connect the parts firmly and prevent axial displacement of the bearing portion 68.

At the same time the upper bearing strips 61 and 62 of element 44 are aligned on opposite sides of the rectangular portion 50 of shaft 38 with the holes 63 and 64 in alignment with opening 51. Sleeve 56 is then placed over the bearing portions 61 and 62 and the shaft portion 50 in the manner indicated in Fig. 7 with its openings 57 aligned with the other passages. Retaining pin 58 is inserted and riveted or flattened at each end as shown at 76. The bearing portions 61 and 62 of beater element 44 are thus locked firmly against the surfaces of the square portion 50 of shaft 38 so that element 44 is rigidly connected to the shaft and will turn with it as a unit. In the assembly shown, element 44 is the outermost of the respective beater elements and is preferably made of relatively heavy material of rectangular cross section, the wider dimension of the cross section extending circumferentially or tangentially with respect to the axis of shaft 38. Thus beater element 44 presents a relatively narrow edge to the material through which it is rotated. At the same time the relatively flat cross section of the element results in a scraping or smearing action which tends to clean the inner surfaces of the bowl and to insure thorough mixing of the bowl contents.

The beater assembly 36 also includes one or more additional beater elements 46 and 48 which may be mounted on shaft 38 for relative rotation with respect to the first beater element. Thus the second beater element 46 includes an upper bearing portion 78 having a circular opening 79 rotatably fitting the portion 52 of shaft 38. The beater element also includes a lower bearing portion 81 of flat material formed into a U-shape. The legs 82 of the U-shaped bearing portion 81 are disposed horizontally and are provided with openings 83 which are likewise of a size for rotatable mounting on shaft portion 52. The bight or circular portion of the U-shaped bearing is indicated at 84 and is attached to the beater element by spot welding or equivalent means. The second beater element 46 includes third and fourth beater members or loops designated as 86 and 92, respectively, which extend from the upper bearing portion 78 to the lower bearing portion 81. The third loop 86 includes a portion 87 extending upwardly and outwardly from the bearing portion 81 along a path substantially symmetrical or similar to the shape of the portions 71 and 74 of the first and second beater loops described above. The upper portion of loop 86 extends radially as indicated at 88 and this radial portion 88 is axially displaced with reference to upper bearing portion 78 and is connected thereto by a short axial section 89. Loop portions 88 and 89 thus constitute an unsymmetrically offset portion lying in the general path of part of the first beater element 44, specifically the radial portion 75 of the second beater loop 73.

The other loop of the second beater element 46, which has been designated as the fourth beater loop of the assembly, is indicated generally at 92. As in the case of the first beater element the two loops of the second beater element are formed from a single piece of material. Thus the lower end 91 of the third beater loop 86 extends through the U-shaped lower bearing portion 81 and is spot welded to it at 85 as shown in Fig. 6. From this lower portion 91 the fourth beater loop includes an upwardly and outwardly extending portion 93 which curves smoothly at its upper end into a radial portion 94 attached to the bearing portion 78 at the driven end of the shaft. As already described, the portions 88 and 89 of the third beater loop 86 are unsymmetrically or axially displaced with respect to the corresponding portion 94 of the fourth beater loop.

This second beater element 46 with its third and fourth loops 86 and 92 is rotatably mounted on the lower portion 52 of shaft 38 as clearly shown in Figs. 1 and 6. The latter figure indicates that the lower leg 82 of the U-shaped bearing 81 rests against the lower portion 68 of the first beater element 44 so that the lower portions of the respective beater elements are in immediate juxtaposition and travel through substantially adjacent paths. This feature is of particular importance in the mixing of relatively small quantities of material because it permits the lower portions of the respective beater elements to agitate thoroughly even though small amounts are to be mixed.

The third or innermost beater element 48 of the present assembly is provided with an upper bearing portion 96 to be mounted at the driven end of shaft portion 52. This bearing portion 96 is similar to the bearing portion 78 of beater element 46 and includes an opening 97 designed to fit shaft portion 52 and permit rotation of the bearing element on the shaft. The bearing also includes radial tubular extensions 98 and 99 for the ends of the loops constituting the beater element. The element also includes a lower bearing portion 101 of flat strip material bent into U-shape similar to the bearing 81 of beater element 46. Bearing 101 has the legs of the U disposed horizontally and provided with openings 102 for rotatable support on shaft portion 52 at the free end of the latter.

Between the spaced bearing portions 96 and 101 beater element 48 includes fifth and sixth opposed beater members or loops designated generally as 103 and 110, respectively. Loop 103 includes a main axial portion 104 of the same general configuration as the beater loop portions 71 and 87 previously described and extending upwardly and outwardly from the free end of the shaft. Loop portion 103 merges smoothly into the radial portion 106 which is axially displaced or offset toward the driven end of the beater assembly with respect to the bearing portion 99 and is connected to that bearing portion by an axially extending offset loop portion 107. The lower portion 108 of beater loop 103 passes through the bight of the free end bearing portion 101 and is spot welded thereto at 109.

As in the case of the other beater elements, the sixth beater loop 110 is formed as a continuation of the fifth beater loop 103 and includes a symmetrical section 111 extending upwardly and outwardly from the lower portion 108 of the beater element. Section 111, at the driven end of the assembly, is bent radially as shown at 112 for connection to portion 98 of the bearing 96.

Thus beater element 48 and its fifth and sixth loops 103 and 110 are similar in shape and construction to the beater element 46 with its third and fourth beater loops 86 and 92. The element 48, however, is somewhat smaller than element 46 so that it may be rotatably mounted on shaft portion 52 inside of the beater element 46.

The loops of the inner or second and third beater elements 46 and 48 are circular in cross section and of relatively small diameter. These circular or wire-like loops in combination with the flat outer loop are unusually efficient in operation. For some purposes, a beater loop of flat or rectangular cross section is advantageous. In other cases, wire beater loops of circular cross-section are desirable. The present beater combines the advantages of both types of loop in a single assembly which gives a superior mixing action and is capable of a wide range of use.

Although these beater elements and their loops are substantially the same in shape as pointed out above, it should be noted that the similarity is not exact. Thus in Figure 1, all three beater elements are in immediate juxtaposition at the free end of the beater shaft. The lower or remote (i. e., remote from the driven end of the shaft) ends of the elements accordingly pass through horizontally adjacent paths during the beating operation and make possible the thorough agitation of small quantities of material in the manner discussed.

From this free end of the beater assembly, the loops of the respective beater elements diverge slightly from each other toward the driven end of the assembly. Thus the spacing between beater loops 70, 86, and 103 gradually increases from the free end toward the driven end of the unit. The spacing between beater loops 73, 92, and 110 likewise increases in the same manner. Finally, although the bearing portions of the beater elements are immediately adjacent each other at the free end of the assembly, there is a substantial axial spacing between the bearing portions 78 and 96 of the rotatably mounted inner beater elements, and also between the bearing portion 78 and the lower end of the sleeve 56 of the outer beater element 44. The upper portions or driven end portions of the respective beater elements are similarly spaced axially from each other. Thus the second and third beater elements 46 and 48 are not only capable of relative rotation with respect to each other and with respect to the outer beater element 44, but these elements are also capable of relative axial movement with respect to each other and with respect to the outer beater element 44 in the general directions indicated by arrows 127 and 128 of Fig. 1.

This relative axial movement is of definite importance in the cleaning of the beater since it permits the axial separation of the bearing portions at the free end of the assembly. Furthermore, this mounting of the beater elements for limited relative axial movement also permits the lower beater portions to separate slightly during actual operation of the beater assembly in case the beater elements encounter lumps of material which tend to force the loops apart. Thus the possibility of relative axial movement under the influence of the material to be mixed is believed to contribute to the efficiency of the beater assembly in breaking up lumps or aggregates of the material being mixed.

Since the various beater elements are also mounted for limited relative rotation with respect to each other, as well as for the axial movement just described, it is possible to obtain the operating efficiency of a beater in which the elements are angularly located, with the cleaning efficiency obtainable by relative rotation of these beater elements through an aligned or coplanar position. In Fig. 1 the beater elements have been shown in substantial alignment, with the first, third, and fifth beater loops lying in a common plane with each other and the shaft portion 52.

In Figs. 8 and 9, on the other hand, the respective beater elements are shown in the positions which they occupy during rotation of the assembly in the material to be agitated. Relative rotation between the first and second beater elements in one direction is limited by engagement of the offset portions 88 and 89 against the edge 118 of the second beater loop 73. As shown particularly in Fig. 9, this interengagement takes place when beater loop 86 has been moved relatively from its position in alignment with first beater loop 70 through an angle substantially greater than 90° as measured by the arrow 121.

Thus when the beater shaft 38 and first beater loop 70 are rotated about the shaft axis in the direction of the arrow 119, the particles of material being mixed will engage the third and fourth beater loops 86 and 92 and will tend to prevent their rotation in the same direction or at least to delay such rotation until the offset portions 88 and 89 engage the edge 118 of the second beater loop 73. As soon as these portions engage each other, further rotation of shaft 38 and the first beater element will cause the second beater element to rotate with the shaft as a unit.

Similarly, the resistance of the material against the third beater element will hold back or prevent the rotation of that element, i. e., will cause relative rotation of loop 103 with respect to loop 70 in the direction indicated by arrow 122 of Fig. 9. To limit this relative rotation a stop 113 is provided. This stop includes a horizontal portion 114 (Fig. 2) which is spot welded at 116 to the second beater loop immediately adjacent the bearing portion 62. Stop 113 includes a depending flange 117 which, as shown in Fig. 1, extends toward the free end of the beater shaft sufficiently to lie in the path of the offset portion 106 and 107 of the beater element 43.

Thus relative rotation between the beater loop 103 and the beater loop 70 from the aligned position of Fig. 1 is limited to the angular displacement measured by arrow 122 of Fig. 9 at which point the depending stop portion 117 prevents further relative rotation. When the loop 103 reaches the position of Fig. 9, further rotation of the beater shaft and outer beater element in the direction of arrows 119 will also drive the third beater element in the same direction through the material to be agitated.

Thus in the mixing operation, the three beater elements will be maintained in angularly related positions so that each element may pass through slightly different axially and radially displaced paths. This operating position of Figs. 8 and 9 is also designed to provide substantial dynamic balance for the beater assembly. Because of the presence of extra material in the first, third, and fifth beater loops to provide the axially or unsymmetrically offset portions previously described, these loops are slightly heavier than the opposed second, fourth, and sixth loops.

When these heavier loops are aligned as in Fig. 1, the beater assembly as a whole is obviously in a condition of unbalance. By arrangement of the offset portions and stops so that the operating position of the elements is as shown in Figs. 8 and 9, a construction has been provided in which the beater loop 70, which is heavier than its opposed loop 73, is substantially balanced by the beater loops 86 and 103, which, although lighter individually than loop 70, are in turn heavier than their own opposed loops 92 and 110. The loops 86 and 103 are closer to each other in angular position than either of them is to the heavier loop 70, and thus a condition of substantial dynamic balance is obtained.

When the mixing operation is completed, and the rotation of the beater shaft and assembly in the direction of arrows 119 is stopped, the inner beater elements may be rotated manually with respect to the outer element and shaft back through the paths indicated by arrows 121 and 122 to the aligned position of Fig. 1. While this aligned or flat position facilitates the cleaning of the elements, I have found that such cleaning is even easier when the respective elements can be moved not only to the aligned position, but also beyond that position, or in other words, back and forth in either direction from the aligned position.

The present arrangement makes such cleaning movement possible since the arrangement of unsymmetrically offset beater loop portions is such that the inner beater elements are relatively rotatable through an angular path substantially greater than 180°. In fact the angular path more closely approaches the full 360°. Thus beater loop 86 is movable from the aligned position of Fig. 1 not only in the relative counterclockwise direction measured by arrow 121 of Fig. 9, but also in the relative clockwise direction measured by arrow 123. Such rotation will be limited only by engagement of the offset beater loop portions 88 and 89 against the respective sides of loop portion 118 and of stop 113.

Similarly the fifth beater loop 103 is relatively rotatable from the aligned position of Fig. 1 both in the counterclockwise direction as measured by arrow 122 and also in the counterclockwise direction measured by arrow 124. Thus loops 86 and 103 are movable in either direction from their position of alignment with beater loop 70. In the case of loop 103, the total angular movement closely approximates a complete 360° circle. In the case of the loop 86 the total possible angular displacement is somewhat less than 360° but substantially greater than 180°. By providing for relative rotation of two beater elements through more than 180° I insure the possibility of moving one element in both relative directions to a position of alignment with the other beater element.

For simplification of the preceding discussion, the directions of relative rotation have been referred to the axis of the beater shaft 38 as if this shaft itself remained in a stationary position. It will be understood, of course, that in the specific planetary type of mixer shown in Fig. 1, the beater shaft as a whole will revolve in a circular path as indicated by the dotted line and arrow 126 of Fig. 9. At the same time, the shaft is rotating on its own axis in the direction of arrows 119. Furthermore, although the preferred form of the beater assembly has been shown in connection with a planetary type mixer, many of the novel features of construction are equally advantageous in a non-planetary beater where the beater assembly rotates about a stationary axis. Finally, while the relative rotation of the respective beater elements has been limited by axially offset portions and interengaging stops in the present construction, other arrangements and locations of the interengaging stop portions are possible.

In the example described above, the relative axial location of the driven ends of the respective beater loops as shown in Fig. 1 from the driven end toward the free end of the beater is in the order of first, third, second, fifth, fourth, and sixth beater loops. At the same time the stop on the second beater loop extends axially from that loop to a position beyond the offset portion of the fifth beater loop.

In Figs. 10 and 11 another embodiment of the present invention has been shown. The beater assembly shown in these figures includes a beater shaft 129 wtih the usual driving connection, such as pin 130, and first and second beater elements 131 and 132, respectively. Beater element 131 in turn includes a first beater member or loop 133 and a second beater member or loop 134. The loops 133 and 134 are preferably formed from a single strip of material in substantially circular shape with the lower end portions of the loops clamped to the lower free end of shaft 129 by a nut 136. The upper or driven end of the loops is rigidly mounted on a reduced lower portion of shaft 129, either by welding as at 137 or by provision of interfitting non-circular beater and shaft portions at this point (not shown).

The second or inner beater element 132 similarly includes third and fourth beater members or loops 138 and 139 respectively. These loops are similarly formed of a single strip of material in circular shape, the lower or remote ends 141 being rotatably mounted on shaft 129 adjacent the lower or remote end of the first beater element, with a spacing washer between the elements. The upper or driven end 142 of the second beater element is rotatably supported on the reduced portion of the shaft at a point spaced somewhat below the upper portion 137 of the outer beater element. For convenience in assembly spacers 135 and 140 are used on shaft 129 to locate the beater portions axially. Upper spacer 135 is rigidly connected to the shaft and to the upper portion of beater element 131 by welding or other suitable means. Lower spacer 140 may be freely rotatable on the lower portion of shaft 129.

In order to limit the relative rotation of the inner and outer beater elements, a stop 143 is provided on the third beater loop 138. Stop 143 may be formed as an integral portion of the beater loop which is struck upwardly as shown in the drawings. A cooperating stop 144 is provided on the sleeve 135 which rotates with beater shaft 129. Stop 144 is located at a point lying in the path of rotation of the first stop 143. Thus the inner or second beater element may be rotated relatively with respect to the first beater element and shaft from the flat or aligned position of Fig. 10 to the angularly displaced position of Fig. 11 through an angular path measured by arrow 145 in the latter figure. Such relative rotary displacement will take place whenever the shaft 129, sleeve 135, and the outer beater element are rotated on the shaft axis in the direction of arrow 147, and the inner beater element is retarded by engagement with the material to be mixed.

When the mixing operation is completed, the inner beater element 132 may be rotated in the opposite direction with respect to the outer beater element 131 not only back to the aligned or coplanar position of Fig. 10, but through and beyond that position in the opposite direction as measured by the arrow 146 of Fig. 11, until stop 143 engages the opposite side of stop 144. Thus in the construction shown, the inner beater element is relatively rotatable through almost 360° with respect to the outer beater element. As a result, certain of the advantages previously set forth are obtained in this alternate embodiment of the invention, such as the efficiency of angularly displaced beater elements during the mixing operation and the ease of cleaning of beater elements which are relatively movable in either direction from an aligned or coplanar position.

According to the foregoing description, a beater assembly has been described which accomplishes the objects set forth at the beginning of this application. This beater assembly combines the advantages of angularly related beater loops during operation, with the ease of cleaning of aligned or relatively movable beater loops.

Since minor variations and changes in the exact details of construction will be apparent to persons skilled in this field, it is intended that this invention shall cover all such changes and modifications as fall within the spirit and scope of the attached claims.

Now, therefore, I claim:

1. A beater assembly comprising a shaft to be rotated, a first beater element fixed on the shaft for rotation therewith, a second beater element rotatably mounted with respect to the shaft, and a stop on a rotating part of the beater assembly in the path of the second beater element for driving the latter with the shaft during the mixing operation, the second beater element being relatively rotatable on the shaft from said operating position to and beyond a position in alignment with the first beater element.

2. A beater assembly comprising a shaft to be rotated, a first beater element fixed to the shaft for rotation therewith, a second beater element rotatably mounted with respect to said shaft, interengaging portions on the second beater and a rotating part of the beater assembly limiting the relative rotation of the second beater in one direction and thereby driving the second beater element with the first beater element and shaft during rotation of the shaft, the second beater being relatively rotatable on the shaft in the opposite direction through at least 180°.

3. A beater assembly comprising a shaft to be rotated, a first beater element fixed on the shaft, a second beater element mounted on the shaft for relative rotation in two directions from a position in alignment with the first beater element, and interengaging portions on the second beater element and a rotating part of the beater assembly limiting the relative rotation of the second element in one direction.

4. A beater assembly comprising a shaft, first and second beater members mounted on the shaft, and interengaging portions on the members and shaft limiting relative rotation of both members in one direction with respect to the shaft, at least one beater member being relatively rotatable in the opposite direction with respect to the shaft and other beater member from a position angularly displaced on one side of the other member to a position angularly displaced on the opposite side of said other member.

5. A beater assembly comprising a shaft, a first beater element fixed to said shaft for rotation therewith, two additional beater elements rotatably mounted on the shaft, and interengaging portions on the respective elements limiting relative rotation of the last two beaters in one direction with respect to the first beater, the second and third beaters being relatively rotatable in the opposite direction to a cleaning position.

6. A beater assembly according to claim 5 in which the interengaging portions include unsymmetrically offset portions on the second and third beaters.

7. A beater assembly according to claim 5 in which the interengaging portions include axially displaced portions on the second and third beater elements.

8. A beater assembly comprising a shaft, inner and outer beater members mounted on the shaft, interengaging means on the beater members and shaft for driving both beaters in one direction with the shaft, one of the beater members being mounted for relative rotation in either direction from a position in alignment with the other beater member.

9. A beater assembly according to claim 8 in which the inner beater is mounted for relative rotation and the outer beater is fixed to the shaft.

10. A beater assembly according to claim 9 in which the outer beater is of relatively flat elongated cross section with its long dimension disposed circumferentially of the shaft, and the inner beater is of relatively round cross section.

11. A beater assembly comprising a shaft, a first beater element mounted on the shaft, a second beater element having spaced bearing portions rotatably mounted on the shaft and first and second beater loops extending from one bearing to the other, one of the loops having a portion which is axially displaced with respect to the corresponding portion of the other loop, said axially displaced portion being in the path of the first beater element and limiting the relative rotation of the beater elements in at least one direction, and all portions of the other loop being out of the path of the first beater element for free relative rotation of the elements in the other direction through at least 180°.

12. A beater assembly comprising a shaft to be rotated, first and second beater elements mounted on the shaft, at least one of the beater elements being rotatable with respect to the shaft, and a stop on the shaft in the path of the rotatable beater element limiting its relative rotation in at least one direction and thereby positively rotating the beater with the shaft on rotation of the shaft in the other direction.

13. In a beater assembly comprising a shaft having a circular portion, and a beater element rotatably mounted on the shaft, the beater element including a beater loop of relatively narrow cross section extending transversely of the circular shaft portion, the improvement comprising a U-shaped bearing portion having the legs of the U rotatably mounted on the circular shaft portion and the bight of the U extending around the beater loop and fastened thereto.

14. In a beater assembly comprising a shaft, and first and second beater elements rotatably mounted on the shaft, each beater element having a beater loop of relatively thin circular cross section extending transversely of the shaft, the improvement comprising a U-shaped bearing of relatively flat strip material for each beater loop, the legs of the U-shaped bearings being rotatably mounted on the shaft and the respective beater loops lying within the bight of their respective U-shaped bearings, the two U-shaped bearings being mounted immediately adjacent each other for rotation of the transverse beater loops through axially adjacent paths.

15. A beater assembly comprising a shaft and three beater elements mounted on the shaft, the first beater element being fixed to the shaft for rotation therewith and the second and third beater elements being relative rotatable with respect to the shaft, each of said second and third beater elements having an unsymmetrically offset portion, a portion on the first beater element in the path of the offset portion of the second beater element limiting relative rotation of the first and second elements in one direction to an operating position in which the second element is angularly displaced on one side of the first beater element, and a second stop portion on the first beater element in the path of the offset portion of the third beater element limiting relative rotation of the third and first beater elements in said one direction to an operating position in which the third beater element is angularly displaced on the other side of the first beater element.

16. A beater assembly comprising a shaft having a free end and a driven end, an outer beater element fixed to the shaft and having first and second opposed beater loops fastened to the free end of the shaft and another portion fastened to the driven end of the shaft, the portion of the first loop adjacent the driven end of the shaft being axially displaced toward the driven end from the corresponding portion of the second loop, a second beater element rotatably mounted on the shaft inside the first element and including a bearing portion near the free shaft end, a bearing portion toward the driven shaft end, and third and fourth beater loops extending between the bearings, the portion of the third beater loop at the driven end of the shaft being axially displaced toward the driven end from the corresponding portion of the fourth loop, and a third beater element rotatably mounted on the shaft inside the first and second beater elements, the third beater element including a bearing portion at the free end of the shaft, a bearing end toward the driven end of the shaft, and fifth and sixth beater loops extending between the last-mentioned bearings, the portion of the fifth loop at the driven end of the shaft being axially displaced toward the driven end with respect to the corresponding portion of the sixth beater loop, the second beater loop having a portion in the path of the offset portion of the third beater loop limiting relative rotation of the second beater element to a position angularly displaced on one side of the first beater element, and a second stop portion on said second loop lying in the path of the offset portion of the fifth beater loop limiting relative rotation of the third and first beater elements to determine an operating position of the third beater element angularly displaced on the opposite side of the first beater element, the second and third beater elements being relatively rotatable from their operating positions in the opposite relative direction to a position in which all three beater elements are in substantial alignment for cleaning.

17. A beater assembly comprising a shaft, a first beater element mounted on the shaft and having first and second opposed beater loops, a second beater element mounted on the shaft and having third and fourth opposed beater loops, and a third beater element mounted on the shaft and having fifth and sixth opposed beater loops, the first, third, and fifth beater loops each having a portion axially offset with respect to the corresponding portions of the second, fourth, and sixth beater loops, the second and third beater elements being relatively rotatable on the shaft in either direction from the position in which the first, third, and fifth loops are in alignment, a portion of the second loop lying in the path of the offset portion of the third loop limiting the relative rotation of the second beater element in one direction from said position of alignment to an operating position in which the third loop is angularly displaced on one side of the second loop, and a stop portion on the second loop angularly and axially displaced from the portion of the loop which engages said third loop, said angularly and axially displaced stop portion lying in the path of the offset portion of the fifth loop and limiting relative rotation of the third and first beater elements to an operating position in which the fifth loop is angularly displaced on the opposite side of the second loop from the operating position of the third loop.

18. A beater assembly comprising a shaft having a free end and a driven end, a first beater element mounted on the shaft and having first and second beater loops extending from the free end of the shaft to points spaced toward the driven end, a second beater element having third and fourth opposed beater loops extending from the free end of the shaft to points spaced toward the driven end, and a third beater element mounted on the shaft and having fifth and sixth beater loops extending from the free end of the shaft to points spaced toward the driven end, the first beater element being fixed on said shaft and the second and third beater elements being relatively rotatable with respect to the first beater element, the first, third, and fifth beater loops having portions similarly offset axially toward the driven end with respect to the corresponding portions of the second, fourth, and sixth loops, the relative axial location of said offset and corresponding loop portions from the driven toward the free end of the shaft being in the order first, third, second, fifth, fourth, and sixth loop portions.

19. A beater assembly according to claim 18 in which the second beater loop includes an angularly displaced stop extending axially from the driven end of the second loop toward the free end of the shaft, and lying in the path of the offset portion of the fifth loop only.

20. A beater assembly comprising a shaft and a plurality of beater elements mounted on the shaft, at least two of the beater elements having radially extending portions which normally pass through axially adjacent paths on rotation of the assembly, said two elements being relatively movable with respect to each other through a substantial distance axially of the shaft for axial separation of said radially extending portions both during cleaning and also under the influence of particles of material during operation of the beater assembly.

21. A beater assembly comprising a shaft and a plurality of beater elements mounted on the shaft, interengaging means on the shaft and beater elements driving the beater elements in one direction with the shaft, at least two of the beater elements having radially extending portions which normally pass through axially adjacent paths on rotation of the assembly, one of the beater elements being mounted for both relative rotary displacement and substantial axial displacement with respect to another beater element for axial separation of said radially extending portions both during cleaning and also under the influence of particles of material during operation of the beater assembly.

22. A beater assembly comprising a shaft, and at least two beater elements mounted on the shaft, one of the beater elements being rotatably mounted with respect to the shaft, and each of the beater elements having two loops, one loop of one beater element having a portion unsymmetrically offset with respect to the corresponding portion of the other loop of that beater element, and one loop of the other beater element having a portion similarly offset with respect to the corresponding portion of the remaining loop of said other beater element, the offset portion of one element engaging only the corresponding or non-offset portion of the other element and limiting relative rotation of the respective elements in one direction, said elements being relatively freely rotatable in the opposite direction to and beyond a position in which the offset portions of both elements are in alignment on the same side of the shaft.

23. A beater assembly according to claim 22 in which the unsymmetrically offset portion of one loop of each beater element is axially offset with respect to the corresponding portion of the other loop of each element, and in which all of said axially offset and corresponding portions follow separate axially spaced paths upon rotation of the assembly.

24. A beater assembly comprising a shaft having a free end and a driven end, a first beater element mounted on the shaft and having first and second beater loops extending from the free end of the shaft to points spaced toward the driven end, a second beater element having third and fourth opposed beater loops extending from the free end of the shaft to points spaced toward the driven end, one of said beater elements being fixed on said shaft and the other of said beater elements being relatively rotatable with respect to said one element and shaft, the first and third beater loops having portions similarly offset axially toward the driven end with respect to the corresponding portions of the second and fourth loops, the relative axial location of said offset and corresponding loop portions from the driven toward the free end of the shaft being in the order first, third, second, and fourth loop portions.

WALTER VAN GUILDER.

REFERENCES CITED

The following references are of record in the file of this patent:

UNITED STATES PATENTS

| Number | Name | Date |
|---|---|---|
| 235,245 | Hughes | Dec. 7, 1880 |
| 649,683 | Spanier | May 15, 1900 |
| 1,298,544 | Montalto | Mar. 25, 1919 |
| 1,460,493 | Leinan | July 23, 1923 |
| 2,027,297 | Tramposch | Jan. 7, 1936 |

FOREIGN PATENTS

| Number | Country | Date |
|---|---|---|
| 42,743 | France | June 26, 1933 |